(12) United States Patent
Buchlovic et al.

(10) Patent No.: US 11,225,565 B2
(45) Date of Patent: Jan. 18, 2022

(54) PURIFICATION OF SUGAMMADEX

(71) Applicant: SYNTHON B.V., Nijmegen (NL)

(72) Inventors: Marian Buchlovic, Blansko (CZ); Lenka Cernova, Blansko (CZ)

(73) Assignee: Synthon B.V., Nijmegen (NL)

( * ) Notice: Subject to any disclaimer, the term of this patent is extended or adjusted under 35 U.S.C. 154(b) by 0 days.

(21) Appl. No.: 17/045,736

(22) PCT Filed: Apr. 8, 2019

(86) PCT No.: PCT/EP2019/058759
§ 371 (c)(1),
(2) Date: Oct. 6, 2020

(87) PCT Pub. No.: WO2019/193198
PCT Pub. Date: Oct. 10, 2019

(65) Prior Publication Data
US 2021/0179817 A1 Jun. 17, 2021

(30) Foreign Application Priority Data

Apr. 6, 2018 (EP) ..................... 18166146

(51) Int. Cl.
*C08L 5/16* (2006.01)
(52) U.S. Cl.
CPC ............ *C08L 5/16* (2013.01); *C07B 2200/13* (2013.01)
(58) Field of Classification Search
None
See application file for complete search history.

(56) References Cited

U.S. PATENT DOCUMENTS 10,336,835 B2 * 7/2019 Liu ..................... A61K 31/724

FOREIGN PATENT DOCUMENTS

| CN | 106749771 | 5/2017 |
| WO | WO2001040316 | 6/2001 |
| WO | WO2012025937 | 3/2012 |
| WO | WO2014125501 | 8/2014 |
| WO | WO2016194001 | 12/2016 |
| WO | WO2017144734 | 8/2017 |
| WO | WO2017163165 | 9/2017 |

OTHER PUBLICATIONS

Szente Lajos et al, "Analytical characterization of cyclodextrins: History, official methods and recommended new techniques", *Journal of Pharmaceutical and Biomedical Analysis*, New York, NY, US, vol. 130, May 11, 2016 (May 11, 2016), p. 347-365.

* cited by examiner

*Primary Examiner* — Layla D Berry
(74) *Attorney, Agent, or Firm* — Buscher Patent PLLC

(57) ABSTRACT

The invention deals with a novel process for purification of the pharmaceutically useful product sugammadex of formula (1).

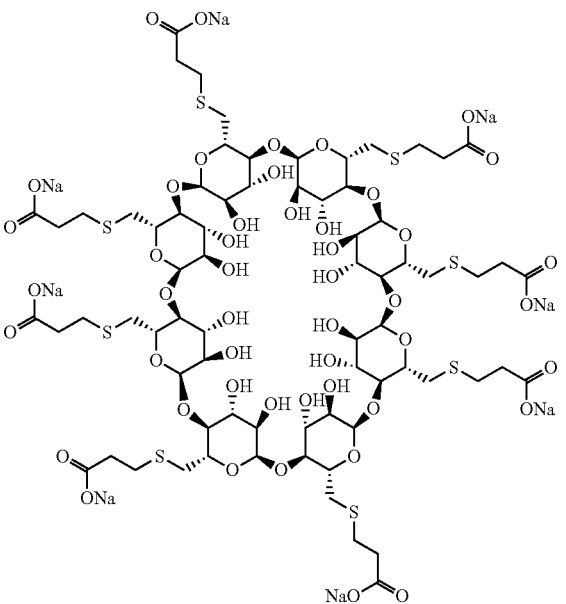

14 Claims, 1 Drawing Sheet

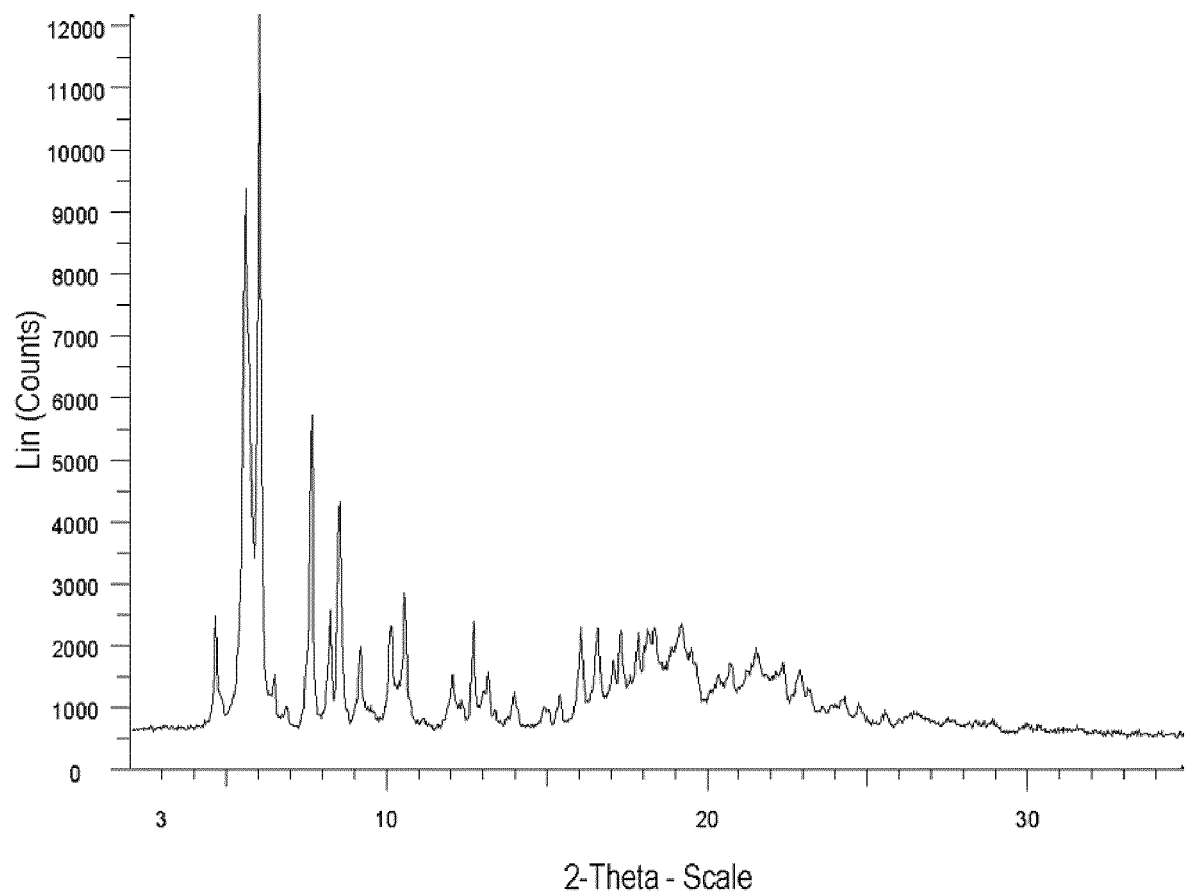

PURIFICATION OF SUGAMMADEX

The invention relates to a novel process for purification the pharmaceutical product Sugammadex.

OVERVIEW OF THE PRIOR ART

Sugammadex, i.e. 6A,6B,6C,6D,6E,6F,6G,6H-Octakis-S-(2-carboxyethyl)-6A,6B,6C,6D,6E,6F,6G-octasulfanyl-gamma-cyclodextrin octasodium salt of formula (1),

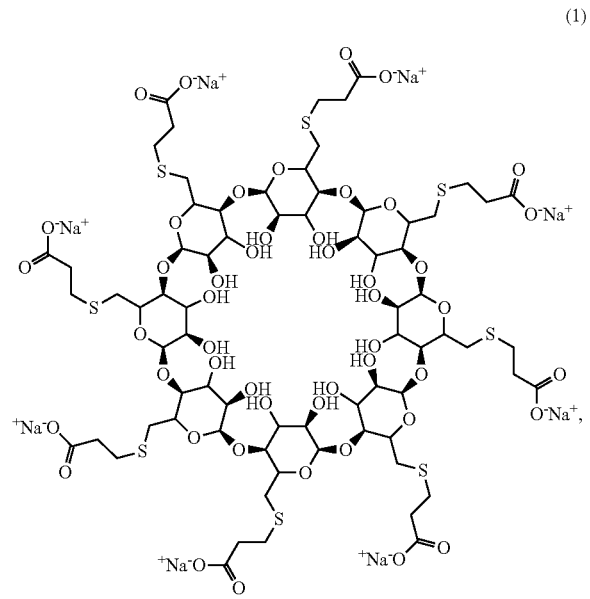

(1)

is a modified γ-cyclodextrin.

Sugammadex is the first selective relaxant binding agent for reversal of neuromuscular blockade by the agent rocuronium or vecuronium in general anesthesia. It was approved in 2008 by EMEA. It is marketed in the form of a sterile solution for intravenous injection under the brand name Bridion®.

Sugammadex was first disclosed in WO2001040316. Processes for preparation of sugammadex are disclosed for example in WO20001040316, WO2012025937, WO2014125501, WO2016194001, WO2017163165 or WO2017144734 applications.

In the prior art processes a compound of formula (2),

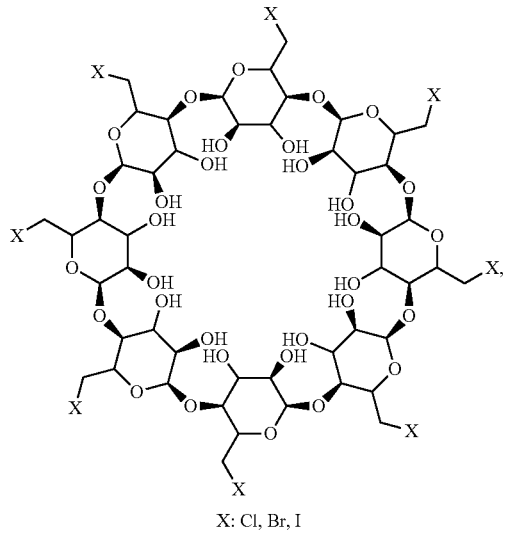

(2)

X: Cl, Br, I is transformed into sugammadex using 3-mercaptopropanoic acid and a sodium base, for example NaH, Na alkoxide or NaOH. The removal of inorganic ions originated in the base from obtained sugammadex is not trivial. Prior art processes advise to use for example dialysis or chromatographic purification. These techniques are not suitable for commercial production.

Sugammadex is marketed in the form of a sterile solution for intravenous injection. It is required to maintain the level of inorganic ions (represented for example by osmolality or sodium content values) on certain levels (for example osmolality value should be between 300 and 500 mOsm/kg according to Bridion® Summary of product characteristics available on webpages of European Medicines Agency).

Therefore, there exists a need for an improved and efficient process for the purification of sugammadex.

BRIEF DESCRIPTION OF THE PRESENT INVENTION

The invention provides a process for the preparation of a solid form of sugammadex comprising:
  a. Suspending sugammadex in a solvent mixture comprising an aliphatic alcohol, 10-30% (vol %) water and an alkylacetate;
  b. Isolating the solid form of sugammadex.

Obtained solid form of sugammadex can be characterized by XRPD pattern having 2θ values 5.5°, 6.0°, 7.6° and 8.5° degrees 2 theta (±0.2 degrees 2 theta). Obtained solid sugammadex can be further characterized by XRPD spectrum depicted in FIG. 1.

BRIEF DESCRIPTION OF THE DRAWING

FIG. 1 represents an XRPD spectrum of a solid form of sugammadex.

DETAILED DESCRIPTION OF THE PRESENT INVENTION

The invention provides a process for the preparation of a solid form of sugammadex comprising:
  a. Suspending sugammadex in a solvent mixture comprising an aliphatic alcohol, 10-30% (vol %) water and an alkylacetate;
  b. Isolating the solid form of sugammadex.

The aliphatic alcohol can be for example methanol or ethanol or 1-propanol or 2-propanol or butanol or 2-butanol or tert-butanol, preferably it is methanol or ethanol, more preferred is methanol.

The alkylacetate can be selected from for example methylacetate or ethylacetate or propylacetate or butylacetate or tert-butylacetate, preferably it is ethylacetate.

The amount of water in the solvent mixture can be between 10 and 30% (vol %), preferably it is between 20 and 25% (vol %). The amount of water between 10 and 30% (vol %) ensures that sugammadex remains in a solid phase, i.e. the mixture is a suspension. By use of the presented process inorganic ions can be easily removed from the obtained solid sugammadex. Additionally to that the obtained solid sugammadex is in the form of a crystalline compound that is characterized by XRPD pattern having 2θ values 5.5°, 6.0°, 7.6° and 8.5° degrees 2 theta (±0.2 degrees 2 theta). Obtained solid sugammadex can be further characterized by XRPD spectrum depicted in FIG. 1.

The amount of the alkylacetate in the solvent mixture can be between 1 and 10% (vol %), preferably it is between 1 and 5% (vol %), more preferably between 1.1 and 2% (vol %).

There are several possibilities how the suspension in the solvent mixture can be prepared. Sugammadex can be suspended in the aliphatic alcohol. Water and the alkylacetate are subsequently added to the suspension. Alternatively sugammadex can be suspended in a mixture of water and the aliphatic alcohol and the alkylacetate. The suspension can also be prepared by suspending sugammadex in mixture of water and the aliphatic alcohol to which the alkylacetate is subsequently added. The suspension of sugammadex in the solvent mixture can be optionally heated to a temperature between 30° C. and the reflux temperature of used solvent mixture, preferably it is heated to a temperature between 45° C. and 65° C. The suspension is stirred at this temperature for 0.5 to 10 hours, preferably for 1 to 3 hours.

The suspension is then cooled to a temperature between −10° C. and 30° C., preferably to a temperature between 10 and 25° C. and is stirred at this temperature for between 0.5 and 3 hours.

Obtained sugammadex is isolated by a suitable isolation technique, for example by filtration and is washed with for example an aliphatic alcohol such as methanol or ethanol or propanol. Obtained sugammadex is dried at an elevated temperature for example between 50 and 90° C., preferably between 80 and 88° C.

The obtained sugammadex can be characterized by XRPD pattern having 2θ values 5.5°, 6.0°, 7.6° and 8.5° degrees 2 theta (±0.2 degrees 2 theta). The obtained sugammadex can be further characterized by XRPD pattern having 2θ values 4.6°, 5.5°, 6.0°, 7.6°, 8.5° and 12.7° degrees 2 theta (±0.2 degrees 2 theta). The obtained sugammadex can be also characterized by XRPD values given in following table:

| Angle 2-Theta ° | Intensity % |
| --- | --- |
| 4.6 | 20.2 |
| 5.5 | 76.5 |
| 6.0 | 100.0 |
| 6.5 | 12.4 |
| 7.6 | 46.7 |
| 8.2 | 20.8 |
| 8.5 | 35.2 |
| 9.1 | 16.0 |
| 10.1 | 18.8 |
| 10.5 | 23.2 |
| 12.0 | 12.4 |
| 12.7 | 19.4 |
| 13.0 | 10.2 |
| 13.1 | 12.7 |
| 13.9 | 10.0 |
| 16.1 | 18.6 |
| 16.6 | 18.6 |
| 17.0 | 14.2 |
| 17.3 | 18.2 |
| 17.6 | 12.4 |
| 17.8 | 17.9 |
| 18.1 | 18.4 |
| 18.3 | 18.5 |
| 18.9 | 16.1 |
| 19.2 | 19.2 |
| 19.5 | 15.8 |
| 20.1 | 10.4 |
| 20.3 | 12.4 |
| 20.7 | 13.8 |
| 21.3 | 12.9 |
| 21.5 | 16.0 |
| 22.4 | 14.0 |
| 22.9 | 13.0 |
| 23.2 | 10.7 |

The obtained sugammadex can be also characterized by XRPD pattern depicted in FIG. 1.

Sugammadex used in the process can be obtained by any method disclosed in the prior art, for example by a method disclosed in WO2001040316, WO2012025937, WO2014125501, WO2016194001, WO2017163165 or WO2017144734 applications.

In comparison to a purification processes disclosed in the prior art the presented purification process has following advantages:
1. It is suitable for industrial scale;
2. It offers material in API quality with controlled amount of inorganic impurities;
3. The produced material is crystalline solid that allows better drying and prevents formation of agglomerates.

The following examples are intended to illustrate the scope of the present invention but not to limit it thereto.

XRPD patterns were obtained using the following measurement conditions:

Panalytical Empyrean diffractometer with Θ/2Θ geometry (transition mode), equipped with a PixCell 3D detector

| | |
| --- | --- |
| Start angle (2θ): | 2.0° |
| End angle (2θ): | 35.0° |
| Step size: | 0.026° |
| Scan speed: | 0.0955°/seconds |
| Radiation type: | Cu |
| Radiation wavelengths: | 1.5406 Å (Kα1), primary monochromator used |
| Divergence slit: | ½° |
| Antiscatter slit: | ½° |
| Soller slit: | 0.02 rad |
| Detector slit: | 7.5 mm |
| Rotation speed: | 30 rpm |

EXAMPLES

Example 1: Purification of Sugammadex 199 g of sugammadex prepared according to a procedure disclosed in example 4 of WO2017144734 application was suspended in 1526 ml of water/methanol (1:4 vol:vol) mixture. The suspension was heated to 50° C. 22 ml of ethylacetate was added to the suspension and the suspension was stirred for 60 minutes at 50° C. The suspension was cooled to 25° C. and filtered. The filtration cake was washed with 3×300 ml of methanol. Isolated sugammadex was dried at 85° C. to yield 175.5 g of sugammadex. XRPD pattern of obtained sugammadex corresponds to XRPD pattern depicted in FIG. 1.

Example 2: Purification of Sugammadex 199 g of sugammadex prepared according to a procedure disclosed in example 4 of WO2017144734 application was suspended in 1221 ml of methanol. 305 ml of water was added to the suspension. The suspension was heated to 50° C. 22 ml of ethylacetate was added to the suspension and the suspension was stirred for 60 minutes at 50° C. The suspension was cooled to 25° C. and filtered. The filtration cake was washed with 3×300 ml of methanol. Isolated sugammadex was dried at 85° C. to yield 179 g of sugammadex. XRPD pattern of obtained sugammadex corresponds to XRPD pattern depicted in FIG. 1.

Example 3: Purification of Sugammadex 199 g of sugammadex prepared according to a procedure disclosed in example 4 of WO2017144734 application was suspended in 1526 ml of water/ethanol (1:4 vol:vol) mixture. The suspension was heated to 50° C. 22 ml of ethylacetate was added to the suspension and the suspension was stirred for 60 minutes at 50° C. The suspension was cooled to 25° C. and filtered. The filtration cake was washed with 3×300 ml of ethanol. Isolated sugammadex was dried at 85° C. to yield 172 g of sugammadex. XRPD pattern of obtained sugammadex corresponds to XRPD pattern depicted in FIG. 1.

Example 4: Purification of Sugammadex 66 g of sugammadex prepared according to a procedure disclosed in example 4 of WO2017144734 application was suspended in 508 ml of water/2-propanol (1:4 vol:vol) mixture. The suspension was heated at 50° C. 8 ml of propylacetate was added to the suspension and the suspension was stirred for 60 minutes at 50° C. The suspension was cooled to 25° C. and filtered. The filtration cake was washed with 3×100 ml of 2-propanol. Isolated sugammadex was dried at 85° C. to yield 56 g of sugammadex. XRPD pattern of obtained sugammadex corresponds to XRPD pattern depicted in FIG. 1.

Example 5: Purification of Sugammadex 66 g of sugammadex prepared according to a procedure disclosed in example 4 of WO2017144734 application was suspended in 508 ml of water/ethanol (1:4 vol:vol) mixture. The suspension was heated at 50° C. 8 ml of methylacetate was added to the suspension and the suspension was stirred for 60 minutes at 50° C. The suspension was cooled to 25° C. and filtered. The filtration cake was washed with 3×100 ml of ethanol. Isolated sugammadex was dried at 85° C. to yield 57 g of sugammadex. XRPD pattern of obtained sugammadex corresponds to XRPD pattern depicted in FIG. 1.

Example 6: Purification of Sugammadex 66 g of sugammadex prepared according to a procedure disclosed in example 4 of WO2017144734 application was suspended in a mixture comprising 406 ml of methanol and 101 ml of water and 8 ml of ethylacetate. The suspension was heated at 50° C. and was stirred at this temperature for 60 minutes. The suspension was cooled to 25° C. and filtered. The filtration cake was washed with 3×100 ml of methanol. Isolated sugammadex was dried at 85° C. to yield 55 g of sugammadex. XRPD pattern of obtained sugammadex corresponds to XRPD pattern depicted in FIG. 1.

Example 7: Comparison of Osmolalities and Sodium Content of Sugammadex Samples

In the following table the osmolalities of sugammadex solution and sodium content in sugammadex samples are summarized. It can be concluded that by using the process according to presented invention both osmolality and sodium content values are significantly decreased when comparing to sugammadex prepared according to the prior art.

Osmolality was measured using OSMOMAT 3000 (Gonotec), a solution (concentration 108 mg/ml) of sugammadex in water was used. The osmolality of the solution was obtained by comparison of freezing point of the sugammadex solution and the freezing point of water.

The sodium content was obtained by titration of sugammadex solution in glacial acetic acid (concentration 3 mg/ml) using 0.1 M solution of $HClO_4$ using Titrator 794 DMS Titrino, Metrohm. The endpoint ($V_{EQ}$) was determined potentiometrically.

| Sample | Osmolality mOsmol/kg | Sodium content % (wt/wt) based on amount of sugammadex |
| --- | --- | --- |
| Prepared according Example 4 of WO2017144734 application | 986 | 11.14 |
| Prepared according to Example 1 | 322 | 8.5 |
| Prepared according to Example 2 | 320 | 8.5 |
| Prepared according to Example 3 | 349 | 8.5 |
| Prepared according to Example 4 | 346 | 8.5 |
| Prepared according to Example 5 | 335 | 8.5 |
| Prepared according to Example 6 | 348 | 8.5 |

Theoretical amount (% wt) of sodium in sugammadex is 8.5% (wt/wt).

The invention claimed is:
1. A process for the preparation of a solid form of sugammadex comprising:
   (a) suspending sugammadex in a solvent mixture comprising an aliphatic alcohol, 10-30% (vol %) water and an alkylacetate; and
   (b) isolating the solid form of sugammadex.
2. The process according to claim 1 wherein the aliphatic alcohol is selected from methanol, ethanol, 1-propanol, 2-propanol, butanol, 2-butanol, or tert-butanol.
3. The process according to claim 2 wherein the aliphatic alcohol is methanol.
4. The process according to claim 1 wherein the alkylacetate is selected from methylacetate, ethylacetate, propylacetate, butylacetate, or tert-butylacetate.
5. The process according to claim 4 wherein the alkylacetate is ethylacetate.
6. The process according to claim 1 wherein the content of the alkylacetate in the solvent mixture is between 1 and 10% (vol %).
7. The process according to claim 6 wherein the content of the alkylacetate in the solvent mixture is between 1 and 5% (vol %).
8. The process according to claim 7 wherein the content of the alkylcetate is between 1.1 and 2% (vol %).
9. The process according to claim 1 wherein suspension of sugammadex in the solvent mixture is heated to a temperature between 30° C. and the reflux temperature of used solvent mixture.
10. The process according to claim 9 wherein the suspension of sugammadex in the solvent mixture is heated to a temperature between 45° C. and 65° C.
11. The process according to claim 1 wherein the suspension in step (a) is stirred for 0.5 to 10 hours.
12. The process according to claim 1 wherein the suspension in step (b) is cooled to a temperature between −10° C. and 35° C.
13. The process according to claim 1 wherein the solid form of sugammadex is dried at a temperature between 50° C. and 90° C.

14. The process according to claim 1 wherein the solid form of sugammadex is characterized by XRPD pattern having 2θ values 5.5°, 6.0°, 7.6° and 8.5° degrees 2 theta (±0.2 degrees 2 theta).

\* \* \* \* \*